United States Patent [19]

Tadokoro et al.

[11] 4,404,804
[45] Sep. 20, 1983

[54] INTERNAL COMBUSTION ENGINE HAVING A TURBO-SUPERCHARGER AND A CATALYTIC EXHAUST GAS PURIFYING DEVICE

[75] Inventors: Tomoo Tadokoro; Masato Iwaki; Haruo Okimoto, all of Hiroshima, Japan

[73] Assignee: Toyo Kogyo Co., Ltd., Hiroshima, Japan

[21] Appl. No.: 223,165

[22] Filed: Jan. 7, 1981

[30] Foreign Application Priority Data

Jan. 10, 1980 [JP] Japan .................. 55-1822[U]
Feb. 15, 1980 [JP] Japan ................. 55-18891[U]
Feb. 20, 1980 [JP] Japan ................. 55-21575[U]

[51] Int. Cl.³ .................... F01N 5/04; F01N 3/08; F02B 37/00
[52] U.S. Cl. ........................... 60/602; 60/280; 60/284
[58] Field of Search .............. 60/600, 601, 602, 603, 60/280, 284

[56] References Cited

U.S. PATENT DOCUMENTS

| | | |
|---|---|---|
| 3,257,796 | 6/1966 | Updike . |
| 3,732,696 | 5/1973 | Masaki .................. 60/284 |
| 4,174,617 | 11/1979 | Jalali-Karchay . |
| 4,197,711 | 4/1980 | Fuhrmann .............. 60/602 |
| 4,202,176 | 5/1980 | Mezger . |
| 4,203,296 | 5/1980 | Tanaka et al. . |
| 4,235,076 | 11/1980 | Meloche ................ 60/602 |
| 4,244,187 | 1/1981 | Lane ..................... 60/602 |
| 4,248,047 | 2/1981 | Sumi ..................... 60/602 |
| 4,271,672 | 6/1981 | Withalm ................ 60/602 |

*Primary Examiner*—Douglas Hart
*Attorney, Agent, or Firm*—Fleit, Jacobson & Cohn

[57] ABSTRACT

An internal combustion engine having a turbo-supercharger and a catalytic exhaust gas purifying device located downstream of the exhaust gas turbine. The exhaust passage is provided with a bypass passage in parallel with the exhaust gas turbine and a valve is provided for opening the bypass passage when the engine operating temperature is below a predetermined value so that the exhaust gas is passed through the bypass passage to the catalytic device. This arrangement is effective to heat the catalytic device rapidly to a working temperature.

12 Claims, 4 Drawing Figures

INTERNAL COMBUSTION ENGINE HAVING A TURBO-SUPERCHARGER AND A CATALYTIC EXHAUST GAS PURIFYING DEVICE

The present invention relates to an internal combustion engine having a turbo-supercharger and more particularly to an internal combustion engine having an exhaust system provided with a catalytic device downstream of the turbo-supercharger.

In order to provide an internal combustion engine with a supply of pressurized air or air-fuel mixture to thereby increase a charge thereto, it has been well known to use a turbo-charger which includes an exhaust gas turbine adapted to be driven by the engine exhaust gas and an air compressor adapted to be driven by the exhaust gas turbine and force the air or air-fuel mixture to the engine combustion chambers. When the turbo-supercharger is used together with a catalytic device which is usually adopted for purifying the exhaust gas, it has been a normal procedure that the catalytic device be located downstream of the exhaust gas turbine due mainly to the fact that it is difficult to find a space for the catalytic device upstream of the exhaust gas turbine since the turbine is necessarily located close to the engine intake system and that the catalytic device absorbs energy in the exhaust gas which may otherwise be applied to the turbine to drive the same.

However, in this type of arrangement, problems have been encountered in that there is a significant temperature drop across the exhaust gas turbine since the turbine has a substantial thermal capacity and the lubricating oil in the turbo-supercharger absorbs the heat in the exhaust gas. The temperature drop apparently has an adverse effect on the function of the catalytic device. Particularly, when the engine operating temperature is low as, for example, in an engine warming-up period after start, the catalytic device itself is also of a low temperature so that the catalytic device cannot provide a satisfactory function of purifying the exhaust gas.

It is therefore an object of the present invention to provide an internal combustion engine having a turbo-supercharger and a catalytic exhaust gas purifying device, in which the temperature of the catalytic device can be rapidly increased under a cold-state operation of the engine.

Another object of the present invention is to provide an internal combustion engine having a turbo-supercharger and a catalytic exhaust gas purifying device, in which means is provided to make the exhaust gas to bypass totally or partly the turbo-supercharger.

According to the present invention, the above and other objects can be accomplished by an internal combustion engine including intake passage means and exhaust passage means, a turbo-supercharger comprised of exhaust gas turbine means provided in said exhaust gas passage means and compressor means provided in said intake passage means, catalytic exhaust gas purifying means provided in said exhaust gas passage means downstream of the exhaust gas turbine means, bypass passage means having one end connected with said exhaust gas passage means upstream of the exhaust gas turbine means and the other end with the exhaust gas passage means between the exhaust gas turbine means and the catalytic exhaust gas purifying means, valve means for controlling said bypass passage means, temperature responsive control means for actuating said valve means to open the bypass passage means when engine operating temperature is below a predetermined value so that at least a part of engine exhaust gas is passed through the bypass passage means to the catalytic exhaust gas purifying means. The term "engine operating temperature" is used herein to mean the exhaust gas temperature, the catalyst temperature or the engine temperature which can be detected in terms of the temperature of the engine cooling liquid or the engine lubricating oil.

According to the feature of the present invention, the engine exhaust gas is passed totally or partly to the catalytic exhaust gas purifying means without passing through the exhaust gas turbine means when the engine is in the cold-state. It is therefore possible to maintain the exhaust gas temperature at the catalytic means to the effect that the catalyst in the catalytic means be heated rapidly to the working temperature. The valve means may be controlled in various ways. In a preferable mode of the present invention, the control means includes means for sensing engine cooling liquid temperature so that the valve means is actuated to open the bypass passage means when the cooling liquid temperature is below a predetermined value. Alternatively, the temperature of the engine exhaust passage means may be detected preferably downstream of the catalytic means.

Further control means may be provided for actuating the valve means to open the bypass passage means when the intake pressure downstream of the compressor means is above a second predetermined value. The further control means may be embodied in the form of a pneumatic actuator which is responsive to the intake pressure between the compressor means and the engine throttle valve means. The valve means may be in the form of a switching valve or a flow divider valve. Where the flow divider valve is used, means may be provided for introducing a secondary air to the exhaust passage means between the position where said one end of the bypass passage means is connected thereto and the exhaust gas turbine means so that the flow of exhaust gas to the exhaust gas turbine means is restricted.

The above and other objects and features of the present invention will become apparent from the following descriptions of preferred embodiments taking reference to the accompanying drawings, in which.

Figure 1:
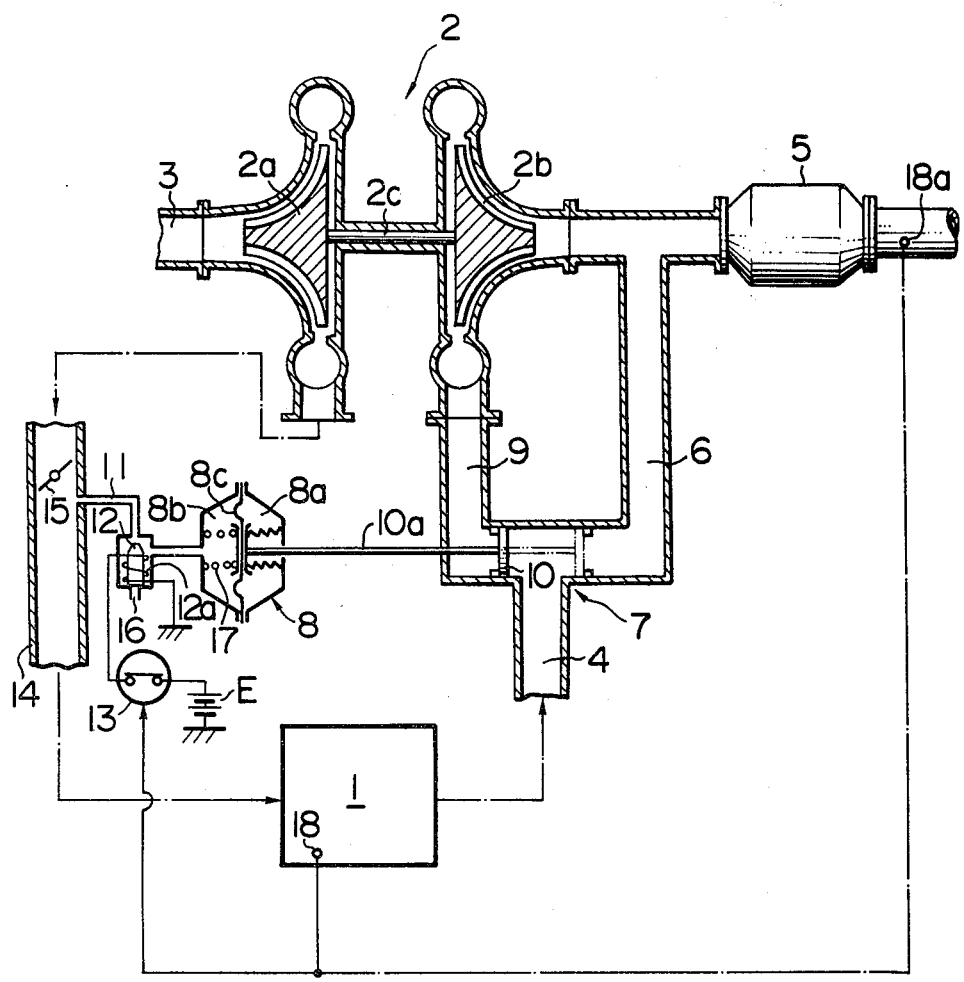
FIG. 1 is a schematic sectional view of an internal combustion engine in accordance with one embodiment of the present invention.

Referring to the drawings, particularly to FIG. 1, the engine shown therein includes an engine block 1 having an intake passage 3 including an intake manifold 14 leading to the engine block 1 and having a throttle valve 15. The engine block 1 further has an exhaust passage 4 having a passage portion 9. At the downstream end portion, the exhaust passage 4 is provided with a catalytic exhaust gas purifying device 5. The engine further includes a turbo-supercharger 2 which includes a compressor 2a disposed in the intake passage 3 and an exhaust gas turbine 2b disposed in the passage portion 9 of the exhaust passage 4. The compressor 2a and the turbine 2b are connected together by a shaft 2c so that the compressor 2a is driven by the turbine 2b.

In FIG. 1, it will be noted that the exhaust gas turbine 2b is located in the exhaust passage 4 upstream of the catalytic device 5. There is provided a bypass passage 6 which is in parallel with the passage portion 9 and has an upstream end connected with the exhaust passage 4 upstream of the turbine 2b and the other end with the exhaust passage 4 between the turbine 2b and the catalytic device 5. Thus, a branch area 7 is provided at the junction between the exhaust passage 4 and the bypass passage 6. In the branch area 7, there is provided a switching valve member 10 for movement between a position shown by a solid line and a position shown by a dotted line in FIG. 1.

The valve member 10 has a valve stem 10a which is connected with a pneumatic actuator 8. The pneumatic actuator 8 includes a diaphragm 8c which defines an atomspheric pressure chamber 8a and a suction pressure chamber 8b. The valve stem 10a extends through the chamber 8a and is connected with the diaphragm 8c. The suction pressure chamber 8b is connected through a suction passage 11 to the intake manifold 14 downstream of the throttle valve 15. In the pressure chamber 8b, there is provided a spring 17 for forcing the valve member 10 to the position shown by the dotted lines so that the bypass passage 6 is closed and the exhaust gas is directed to the passage portion 9 of the exhaust passage 4 and passed through the exhaust gas turbine 2b to the catalytic device 5.

In the suction passage 11, there is provided a solenoid type shut-off valve 12 which functions when energized to connect the suction pressure chamber 8b to the intake manifold 14 closing an opening 16 but to open when de-energized the pressure chamber 8b to the atomsphere through the opening 16 simultaneously closing the passage 11 leading to the manifold 14. The solenoid valve 12 has a solenoid coil 12a which is connected with a power source E through a control switch 13. The control switch 13 is actuated in accordance with a signal from an engine cooling liquid temperature sensor 18 so that it is closed when the cooling liquid temperature is below a predetermined value. Alternatively, the switch 13 may be actuated in accordance with the exhaust gas temperature downstream of the catalytic device 5 by a signal from an exhaust gas temperature sensor 18a or in accordance with the catalyst temperature by a signal from a sensor 18b.

It will be understood that, when the engine cooling liquid temperature is below the predetermined value as, for example, in the engine warming-up period, the switch 13 is closed to energize the solenoid coil 12a so that the suction pressure chamber 8b is connected with the intake manifold 14 downstream of the throttle valve 15. Thus, the intake manifold pressure is applied to the suction pressure chamber 8b to deflect the diaphragm 8c against the action of the spring 17 to thereby shift the valve member 10 to the position shown by the solid line. Therefore, the bypass passage 6 is opened and the exhaust gas passage 9 leading to the turbine 2b is closed. The exhaust gas is then directed substantially totally through the bypass passage 6 to the catalytic device 5 without being cooled by the turbine 2b. It is therefore possible to maintain the exhaust gas temperature to thereby rapidly heat the catalyst to a working temperature.

Figure 2:
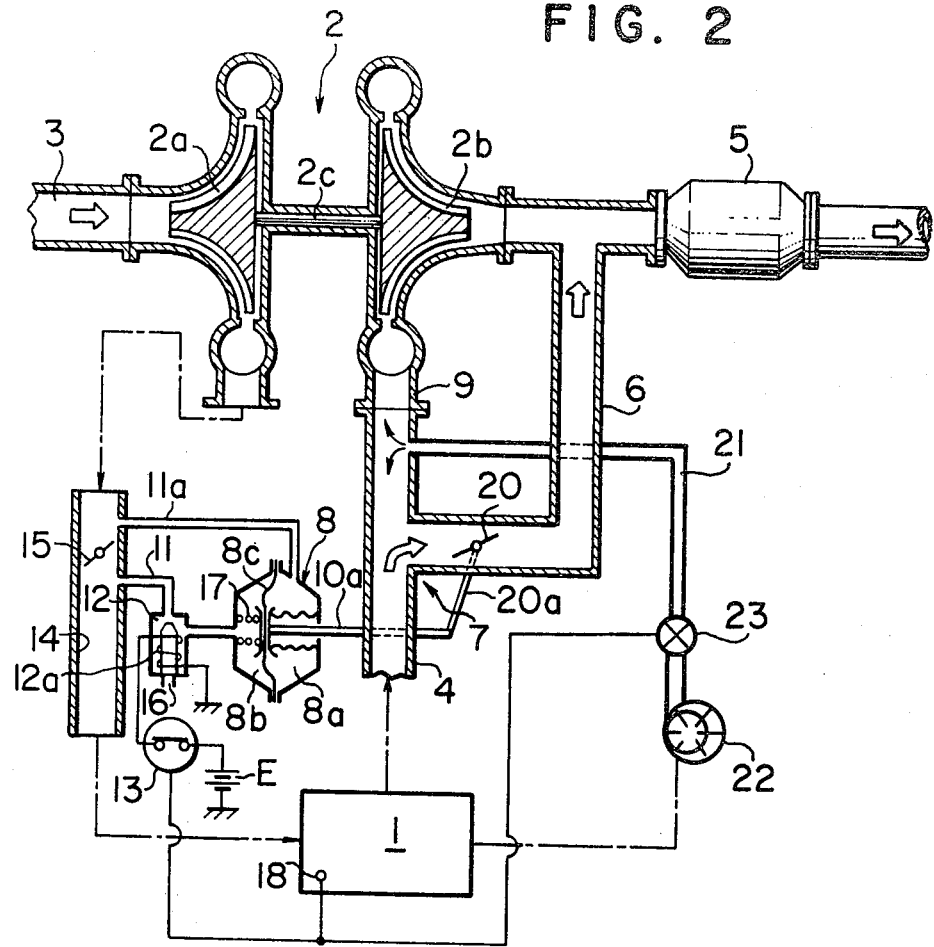
FIG. 2 is a view similar to FIG. 1 but showing another embodiment of the present invention.

Referring now to FIG. 2, there is shown another embodiment of the present invention. The embodiment shown therein is similar in structure to the previous embodiment so that corresponding parts are designated by the same references as in FIG. 1. In this embodiment, the slidable valve member 10 in FIG. 1 is substituted by a butterfly type valve member 20 located in the branch passage 6. The valve member 20 is connected through a lever 20a with the actuating rod 10a to be actuated thereby. The chamber 8a of the pneumatic actuator 8 is not opened to the atmosphere but connected through a line 11a with the intake manifold 14 upstream of the throttle valve 15. It will therefore be understood that the pneumatic actuator 8 is operated in accordance with the pressure drop across the throttle valve 15 in the intake manifold 14 to open the valve member 20 when the engine operating temperature is below a predetermined value. It should further be noted that, in this arrangement, even when the engine operating temperature is high and the suction pressure chamber 8b of the pneumatic actuator 8 is opened to atmosphere, the valve 20 is opened when the pressure upstream of the throttle valve 15 or the supercharging pressure exceeds a predetermined value. This is effective to prevent excessive supercharging.

In this embodiment, there is provided a secondary air supply passage 21 which is opened to the passage portion 9 of the exhaust passage 4 upstream of the turbine 2b. The passage 21 leads from an air pump 22 and provided with a control valve 23 which may be controlled in accordance with the signal from the sensor 18 so that the passage 21 is opened when the engine cooling liquid temperature is below the predetermined value and the valve 20 is opened. Thus, in the arrangement, secondary air is introduced into the passage portion 9 of the exhaust passage 4 when the valve 20 is opened. The secondary air then disturbs exhaust gas flow through the passage portion 4 so that a substantial portion of the exhaust gas is passed through the bypass passage 6 to the catalytic device 5.

Figure 3:
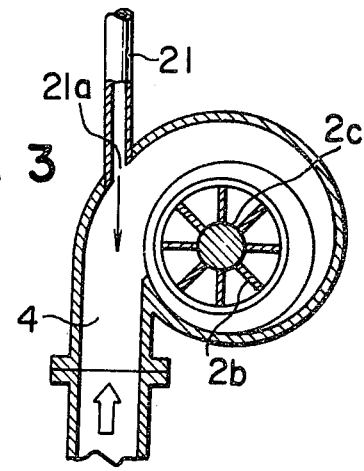
FIG. 3 is a fragmentary sectional view of the compressor showing a modification of the secondary air supply system; and, FIG. 4 is a view similar to FIGS. 1 and 2 but showing a further embodiment of the present invention.

FIG. 3 shows a modification of the arrangement shown in FIG. 2. In this modification, the secondary air passage 21 is opened through a port 21a at the turbine casing in a direction opposite to the direction of the exhaust gas flow to the turbine 2b. The arrangement is effective to disturb the exhaust gas flow to the turbine 2b.

Figure 4:
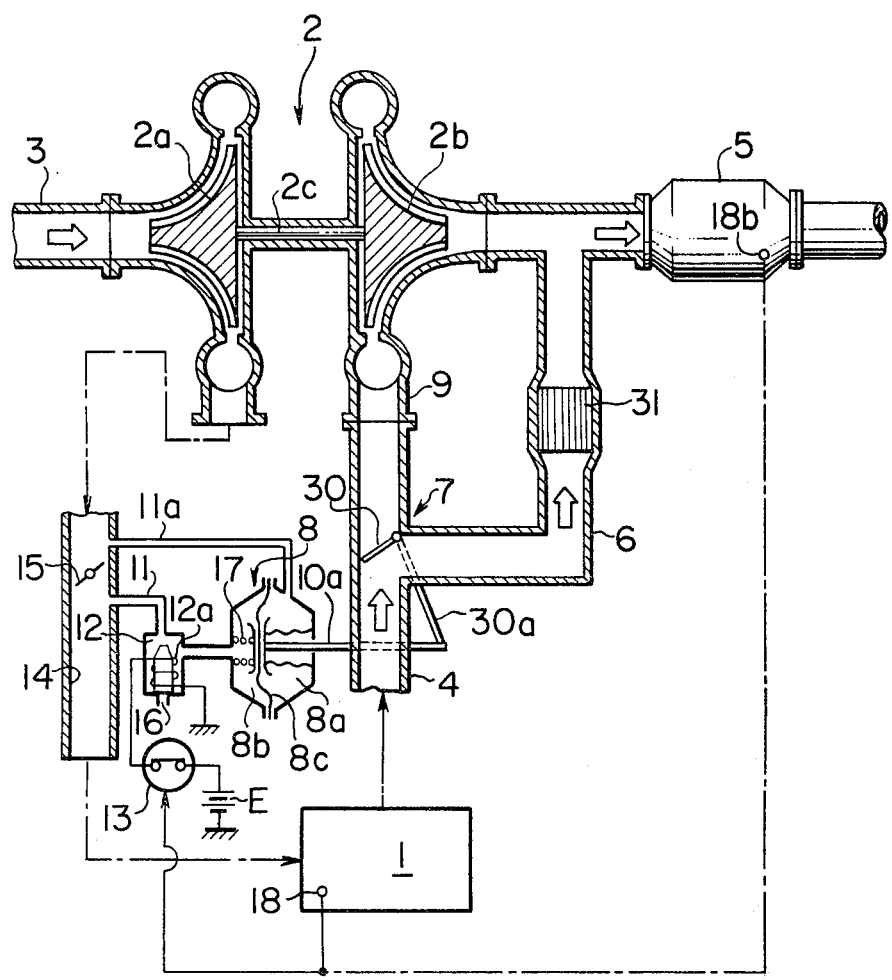

Referring now to FIG. 4, the embodiment shown therein is substantially similar to that shown in FIG. 2 except the secondary air supply system. This embodiment includes a switching valve 30 located in the branch area 7 and connected through a lever 30a to the actuating rod 10a. In this embodiment, the bypass passage 6 is provided with a second catalytic converter 31 which is active even under a relatively low temperature. According to this arrangement, the valve 30 is moved to a position wherein the exhaust gas is substantially totally directed to the bypass passage 6 when the engine operating temperature is below a predetermined value. As the exhaust gas passes through the catalytic converter 31, reaction takes place even under a relatively low temperature so that the exhaust gas temperature is increased to rapidly heat the main catalytic device 5 to the working temperature. Preferably, the second catalytic converter 31 should be of a less thermal capacity than the main catalytic device 5. It is further preferable that the second catalytic device 5 be of a monolithic type than of a pellet type.

The invention has thus been shown and described with reference to specific embodiments, however, it should be noted that the invention is in no way limited to the details of the illustrated structures but changes and modifications may be made without departing from the scope of the appended claims.

We claim:

1. An internal combustion engine including intake passage means and exhaust passage means, a turbo-supercharger comprised of exhaust gas turbine means provided in said exhaust gas passage means and compressor means provided in said intake passage means, first catalytic exhaust gas purifying means provided in said exhaust gas passage means downstream of the exhaust gas turbine means, bypass passage means having one end connected with said exhaust gas passage means upstream of the exhaust gas turbine means and the other end with the exhaust gas passage means between the exhaust gas turbine means and the first catalytic exhaust gas purifying means, valve means for controlling said bypass passage means, temperature responsive control means for actuating said valve means to open the bypass passage means when engine operating temperature is below a predetermined value so that at least a part of engine exhaust gas is passed through the bypass passage means to the first catalytic exhaust gas purifying means, and second catalytic exhaust gas purifying means provided in said bypass passage means and having a smaller capacity than said first catalytic exhaust gas purifying means.

2. An engine in accordance with claim 1 in which the temperature responsive control means includes temperature sensing means for detecting engine cooling liquid temperature so that the valve means is actuated in accordance with the engine cooling liquid temperature.

3. An engine in accordance with claim 1 in which the temperature responsive control means includes temperature sensing means for detecting a temperature in said exhaust passage means so that the valve means is actuated in accordance with exhaust gas temperature.

4. An engine in accordance with claim 3 in which said temperature sensing means is located downstream of the first catalytic exhaust gas purifying means.

5. An engine in accordance with claim 1 which further includes pneumatic actuating means adapted to be operated in accordance with an outlet pressure of the compressor means for actuating the valve means to open the bypass passage means when the outlet pressure of the compressor means exceeds a second predetermined value.

6. An engine in accordance with claim 1 in which said valve means is movable between a closed position wherein it closes the bypass passage means and an open position wherein it opens the bypass passage means, bias means being provided for yieldably biasing the valve means to the closed position to normally close the bypass passage means, said temperature responsive control means being arranged so as to actuate the valve means to the open position against the biasing means.

7. An engine in accordance with claim 6 in which said temperature responsive control means includes pneumatic actuating means which is responsive to an intake suction pressure to actuate the valve means to the open position.

8. An engine in accordance with claim 7 in which said pneumatic actuating means includes a pressure responsive element defining at the opposite sides first and second chambers, said intake passage means having throttle valve means located downstream of the compressor means, said first chamber being connected with the intake passage means between the compressor means and the throttle valve means, said second chamber being connected through suction passage means with the intake passage means downstream of the throttle valve means, said valve means being connected with said pressure responsive element to be actuated thereby, said control means including solenoid valve means located in said suction passage means to open the suction passage means when the engine operating temperature is below the predetermined value to connect the second chamber to the intake passage means downstream of the throttle valve means but opens the second chamber to atmosphere when the engine operating temperature is above the predetermined value.

9. An engine in accordance with claim 6 in which said valve means is a switching valve which alternately opens the bypass passage means and the exhaust passage means leading to the turbine means.

10. An engine in accordance with claim 6 in which said valve means is located in said bypass passage means for closing the same.

11. An engine in accordance with claim 10 in which means is provided for introducing secondary air to the exhaust passage means between the turbine means and said one end of the bypass passage means when the engine operating temperature is below the predetermined value.

12. An internal combustion engine including intake passage means and exhaust passage means, a turbo-supercharger comprised of exhaust gas turbine means provided in said exhaust gas passage means and compressor means provided in said intake passage means, catalytic exhaust gas purifying means provided in said exhaust gas passage means downstream of the exhaust gas turbine means, bypass passage means having one end connected with said exhaust gas passage means upstream of the exhaust gas turbine means and the other end with the exhaust gas passage means between the exhaust gas turbine means and the catalytic exhaust gas purifying means, valve means for controlling said bypass passage means, temperature responsive control means for actuating said valve means for controlling said bypass passage means, when engine operating temperature is below a predetermined value so that at least a part of engine exhaust gas is passed through the bypass passage means to the catalytic exhaust gas purifying means, said valve means being movable between a closed position wherein it closes the bypass passage means and an open position wherein it opens the bypass passage means, bias means being provided for yieldably biasing the valve means to the closed position to normally close the bypass passage means, said temperature responsive control means including pneumatic actuating means which is responsive to an intake suction pressure to actuate the valve means to the open position, said pneumatic actuating means including a pressure responsive element defining at the opposite sides a first and a second chamber, said intake passage means having throttle valve means located downstream of the compressor means, said first chamber being connected with the intake passage means between the compressor means and the throttle valve means, said second chamber being connected through suction passage means with the intake passage means downstream of the throttle valve means, said valve means being connected with said pressure responsive element to be actuated thereby, said control means including solenoid valve means located in said suction passage means to open the suction passage means when the engine operating temperature is below the predetermined value to connect the second chamber to the intake passage means downstream of the throttle valve means and to open the second chamber to atmosphere when the engine operating temperature is above the predetermined value.

* * * * *